Jan. 19, 1932. H. L. JUERGENS 1,841,956
FISH NET
Filed Jan. 23, 1930
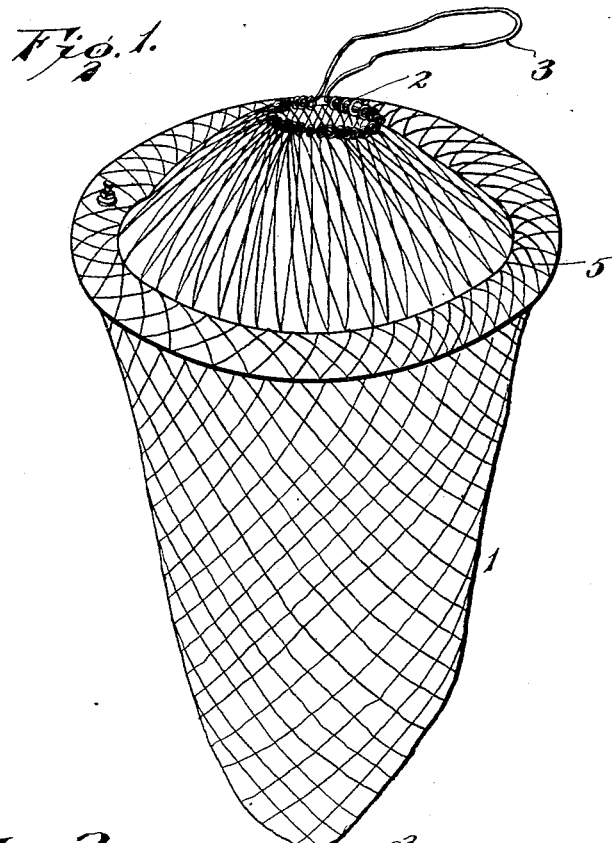
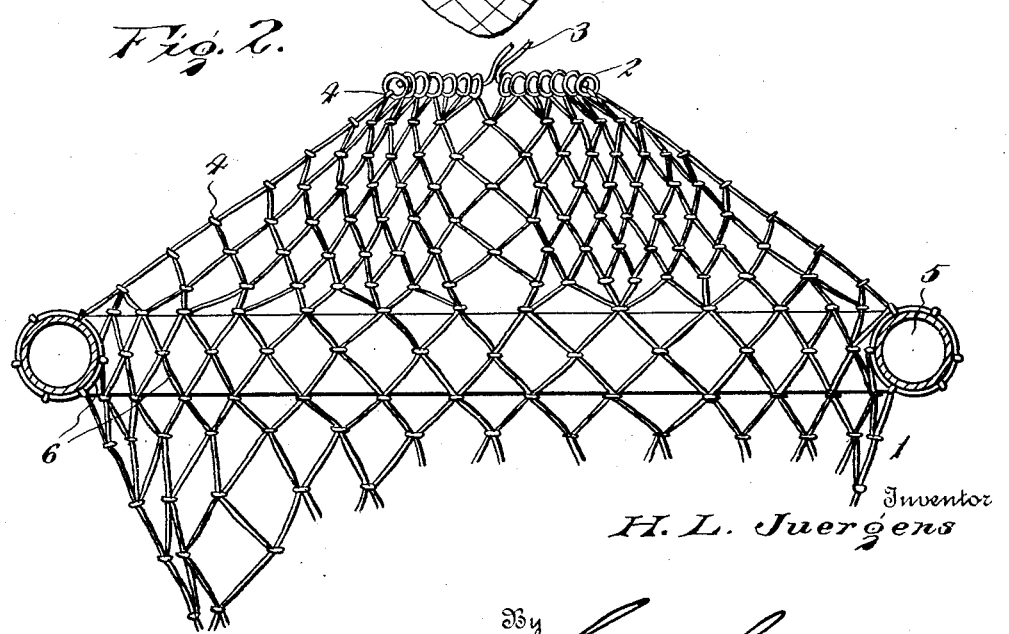
Inventor
H. L. Juergens
By
Lacey & Lacey, Attorneys Patented Jan. 19, 1932

1,841,956

UNITED STATES PATENT OFFICE

HERBERT L. JUERGENS, OF DUBUQUE, IOWA

FISH NET

Application filed January 23, 1930. Serial No. 422,863.

This invention has for its object the provision of means whereby fish may be kept alive and in good condition for a long period or at least until the fisherman is ready to cease his fishing. The invention provides a very light and easily transported receptacle in which fresh fish may be placed as they are caught and restored to the water but confined so that they cannot escape. The invention is illustrated in the accompanying drawings and will be hereinafter fully set forth and defined.

In the drawings:

Figure 1 is a perspective view of a fish net embodying the invention, and

Fig. 2 is an enlarged vertical cross section through the upper portion of the same.

In carrying out the invention, there is provided a net 1 formed of woven fabric of wide mesh so that it may be placed in a body of water and permit free circulation of the water therethrough. The bottom of the net is closed while the upper end or top thereof is open and provided with a plurality of rings 2 through which a draw string 3 is inserted so that by tightening the draw string escape of fish will be prevented. The rings 2 may be separate elements caught in the threads of the fabric of which the net is composed or they may be loops formed of the threads and held in position by the knots, indicated at 4, which hold intersecting threads together. Near the top of the net, there is disposed an inflatable tube 5 of rubber or other elastic material and this tube is held in fixed relation to the net by being placed inside the same and then having additional threads 6 extended across the inner portion of the tube and secured firmly to the body of the net, as clearly shown in Fig. 2.

The woven or knitted fabric of which the net is formed is preferably produced by tying together stout threads so as to form a coarse mesh fabric, as shown in the drawings, and this fabric will, of course, conform to the quantity of fishes inserted in the bag or net and will provide a free circulation of water through the net. In use, the net may be suspended from the side of a boat or other place where the fisherman may be seated so that it will be disposed within the water but cannot be washed away and the mouth or open upper end of the bag or net may be very easily distended so as to admit a fish when desired. The inflatable tube will impart buoyancy to the bag so that it cannot sink and will always be within convenient reach of the fisherman while at the same time it will permit the fish to remain in the water and, therefore, kept alive and fresh until the fisherman is ready to depart. The net is very light and the tube may be easily deflated and inflated so that when not in use the net may be packed in a very small space and easily transported.

Having thus described the invention, I claim:

A receptacle composed of interlaced threads forming an open mesh fabric and having its upper end open and provided with a plurality of open loops, a securing device extending through all of said loops, a buoyant inflatable tube disposed around the receptacle near the upper end thereof, and retaining threads placed about the tube and secured to the interlaced threads of the receptacle.

In testimony whereof I affix my signature.

HERBERT L. JUERGENS. [L. S.]